United States Patent [19]

Minamide et al.

[11] Patent Number: 4,533,525

[45] Date of Patent: Aug. 6, 1985

[54] METHOD FOR INHIBITING CORROSION OF METAL

[75] Inventors: Hiroshi Minamide, Sagamihara; Takashi Shintani, Yokohama; Hiroshi Murayama, Tokyo, all of Japan

[73] Assignee: Toyo Soda Manufacturing Co., Ltd., Shinnanyo, Japan

[21] Appl. No.: 533,695

[22] Filed: Sep. 19, 1983

Related U.S. Application Data

[62] Division of Ser. No. 242,546, Mar. 11, 1981, abandoned.

[30] Foreign Application Priority Data

Mar. 12, 1980 [JP] Japan .................. 55-030289

[51] Int. Cl.³ ............................... B32B 9/00
[52] U.S. Cl. .................. 428/469; 106/14.05; 106/14.25; 106/14.39; 106/306; 427/388.1
[58] Field of Search ............ 106/14.21, 14.39, 306, 106/14.05, 14.25; 427/388.1; 428/469

[56] References Cited

U.S. PATENT DOCUMENTS 3,960,611 6/1976 Walker et al. .................. 106/14.39

Primary Examiner—Lorenzo B. Hayes
Attorney, Agent, or Firm—Armstrong, Nikaido, Marmelstein & Kubovcik

[57] ABSTRACT

This invention relates to a method for inhibiting corrosion of a metal surface comprising coating same with a composition containing an inorganic pigment, more particularly a rust-inhibiting pigment, consisting substantially of a vitrified substance, containing a definite range of $P_2O_5$ and MgO and having a definite range of a specific area thereof.

2 Claims, No Drawings

METHOD FOR INHIBITING CORROSION OF METAL

This is a division of application Ser. No. 242,546 filed Mar. 11, 1981, now abandoned.

DETAILED DESCRIPTION OF THE INVENTION

This invention relates to an inorganic pigment, more particularly an inorganic pigment useful as a rust-inhibiting pigment, and a process for the production thereof.

As rust inhibiting pigments there are conventionally known minium, zinc chromate, lead chromate, lead suboxide, lead cyanamide and zinc powder. However, these rust inhibiting pigments contain poisonous metallic ion components such as lead and chrome and even in their manufacturing processes and their coating processes said poisonous substances are released in the living environments so that even if said substances are excellent for rust inhibiting effects they should not be used at all.

Further, it is known to inhibit a rusting of metallic base body by immersing it into a solution or dispersion of phosphoric acid or phosphates of manganese phosphate, zinc phosphate, calcium phosphate and the like or by coating said body with the solution through spraying. However, said substances lack durability of rust-inhibiting effect, and to obtain a sufficient effect the metallic body must be retreated with diluted chromic acid after a treatment with phosphate whereby the coating process becomes complicated and the working environment is contaminated.

The inventors of the present invention have made hard studies to obtain a pigment which does not cause environmental contamination and which is excellent in rust inhibiting effect, and as a result the present invention has been accomplished.

The first object of the invention is to provide an inorganic pigment which contains $15 \sim 80\%$ by weight of $P_2O_5$ and $20 \sim 80\%$ by weight of MgO in terms of oxides of phosphorus and magnesium respectively, in which the specific surface area is at least $0.1$ m$^2$/g and which consists substantially of a vitrified substance.

The second object of the invention is to provide an inorganic pigment which contains $10 \sim 70\%$ by weight of $P_2O_5$ and $5 \sim 75\%$ by weight of MgO in terms of oxides of phosphorous and magnesium respectively, and more than one components selected from the group of aluminium, silica, calcium, manganese and boron in such proportion as $5 \sim 30\%$ by weight of $Al_2O_5$, $10 \sim 50\%$ by weight of $SiO_2$, $15 \sim 40\%$ by weight of CaO, $0.2 \sim 5\%$ by weight of $MnO_2$ and $0.1 \sim 4\%$ by weight of $B_2O_3$ in terms of oxides thereof, in which the specific surface area is in the range of $0.1 \sim 40$ m$^2$/g, and which consists substantially of a vitrified substance.

The tirhd object of the invention is to provide a process for the production of an inorganic pigment, characterized in that a phosphorous-containing material is mixed with a magnesium-containing material, the mixture is heated to be molten, and the molten substance is quickly quenched thereby to obtain a fine vitrified substance.

The fourth object of the invention is to provide a process for the production of an inorganic pigment, characterized in that there are mixed a phosphorous-containing material, a magnesium-containing material, aluminium-containing material, a silica-containing material, a calcium-containing material, and a manganese-containing material or a boron-containing material, the mixture is heated to be molten, and then the molten substance is quickly quenched thereby to obtain a fine vitrified substance.

The invention employs, as said phosphorous-containing materials, orthophosphoric acid, metaphosphoric acid, pyrophosphoric acid, hexametaphosphoric acid, tripolyphosphoric acid, phosphorous acid, hypophosphorous acid or salts thereof, phosphorous pentaoxide, rock phosphate based on apatite ($Ca_3(PO_4)_2 \cdot CaS_2$), and the like.

The use amount of the phosphorous-containing materials may vary depending upon their grade, but usually the optimum use amount will be such that the final composition of the pigment is between 15% and 80% by weight based on $P_2O_5$.

Further, as the magnesium-containing materials there are employed magnesium oxide, magnesium carbonate, magnesium silicate, magnesite, brucite, dolomite, serpentine, peridotite and the like. The use amount of these materials will be optimum, as in the case of the phosphorous-containing materials, in that the final composition of the pigment is between 20% and 85% by weight based on MgO.

With regard to the magnesium-containing material it is possible to use a slag of ferronickel or ferrochrome as a substitute therefor, because such slag usually consists of $1 \sim 5\%$ by weight of CaO, $33 \sim 55\%$ by weight of $SiO_2$, $30 \sim 35\%$ by weight of MgO, $1 \sim 25\%$ by weight of $Al_2O_3$ and the like and it contains magnesium oxide.

It is also capable of obtaining a composition of the inorganic pigment of the invention by adding to the above materials, as necessary, aluminium-containing materials such as alumina, aluminium phosphate and alumina ore phosphate, or silica-containing materials such as siliceous sand, magnesium silicate, calcium silicate and sodium silicate, and by heating the mixture for melting. In said composition, the phosphorous and magnesium are adjusted as $10 \sim 70\%$ by weight of $P_2O_5$ and $5 \sim 75\%$ by weight of MgO in terms of their oxides while more than one components selected from the group consisting of aluminium, silica and calcium are adjusted as $5 \sim 30\%$ by weight $Al_2O_3$, $10 \sim 50\%$ by weight of $SiO_2$, and $15 \sim 40\%$ by weight of CaO respectively in terms of their oxides. Even this inorganic pigment thus obtained will never lose its performance.

Further, preferably a slight amount of manganese or boron component may be added in addition to said composition, in view of improving the durability of the rust inhibiting effect of the inorganic pigment as obtained. These components can be easily contained by mixing with them, before melting the materials, a manganese-containing material such a rock manganese or a boron-containing material such as boron sand, etc.

In said component in a slight amount it will be more effective to usually include into the final inorganic pigment, $0.2 \sim 5\%$ by weight MnO or $0.1 \sim 4\%$ by weight of $B_2O_3$ in terms of oxide thereof.

The above substances as material are suitably mixed, the mixture is guided into a heat-melting apparatus such as electric furnace (three-phase resistance furnace) or open hearth furnace, and it is heated for melting, preferably at temperatures in the range $1250° \sim 1450°$ C.

According to the invention it is preferable to quickly quench the obtained molten mixture, because there can be obtained a substantially vitrified substance. One of the preferable quick quenching methods is to either project or spray said molten substance into a lot of jetting water current.

Simultaneously with the quick quenching there is obtained a glass-like substance which is very fine (the specific surface area by BET Process being at least 0.1 m$^2$/g). Further, it is possible to obtain the same effect as in the above quick quenching even to scatter said molten substance into water or a water mist atmosphere by using a rotary disc or cylinder and to cool it quickly at a temperature below 1000° C.

The glass-like substance thus obtained can be used as it is as a rust inhibiting pigment or a body, extender pigment, but if necessary it is divided further finely for use with mechanical percussion. Usually, by this division the specific surface area is adjusted to 1~40 m$^2$/g. The dividing of the vitrified substance will improve the dispersing property to paint, accelerate the painting and serve for the formation of even painting film. The thus obtained pigment of the present invention is used by conventional means.

As painting-film forming vehicle there are used dry oil, denaturated dry oil and water-soluble resins or emulsion resins such as alkyd resin, epoxy resin, phenol resin, melamine resin, acrylic resin, polyvinyl acetal, vinyl chloride resin, polyvinyl acetate, polyurethane resin, and polyester resin. And the present pigment is used in the form in which it is dispersed in said vehicles. When a painting film is formed by using the pigment obtained according to the invention, the film presents a higher rust inhibiting effect than in zinc chromate and minium which are conventionally most effective in rust resistance and used most widely. That is, in water resistancy the present pigment has the same effect as chrome type pigments while in salt water resistancy it gives an effect higher than the chrome type pigments.

Furthermore, the specific surface area of the pigment obtained by dividing in the invention is usually in the range 1~40 m$^2$/g so as to be very excellent in transparency so that the present pigment possesses also a performance as a body, extender pigment, which is same as or higher than sedimentary barium sulphate, sedimentary potassium carbonate and alumina white which are conventionally used as body, extender pigments.

As described above in detail, the present invention provides an inorganic pigment which does not polute the living environments, is rich in rust inhibiting effect and possesses also an essential feature as a body, extender pigment. Moreover, according to the manufacturing process of the invention, as described above, it is characterized by heating and melting the materials and quenching the obtained molten mixture rapidly, and therefore any particular measure need not be taken for the adjustment of the pigment composition or the heating means thereof. Accordingly, the inorganic pigment of the invention has a different merit in that it can be produced very cheap.

The following examples illustrate the present invention but not to be construed as limiting the scope of the invention.

In the Examples part and percent represent parts by weight and % by weight respectively.

EXAMPLE 1

There were used orthophosphoric acid (first class grade chemical) as a phosphorous component and magnesium oxide (first class grade chemical) as a magnesium oxide component, these components were mixed according to the composition of Table 1, and the mixture was heated for melting at 1400° C. in an electric furnace for one hour.

Then, the obtained molten substance was projected into a lot of water current, quickly quenched, filtered and dried thereby to obtain a glass-like magnesium polyphosphate.

The glass-like magnesium polyphosphate was crushed and classified thereby obtaining a glass-like magnesium polyphosphate whose specific surface area is 5.4 m$^2$/g. In the test example referred to later, the glass-like magnesium polyphosphate obtained in Example 1 is shown as specimen 1.

EXAMPLES 2~5

Except that metaphosphoric acid or hexametaphosphoric acid was used as a phosphorous material, and magnesium oxide, magnesium or serpentine as a magnesium component material in the amounts shown in Table 1, the materials were heated, melted, quickly quenched and divided according to Example 1, and as a result there was obtained a pigment having a composition and a particle diameter shown in Table 1.

TABLE 1

| Example No. | Material | | Composition of main components of product (%) | | | Specific surface area (m$^2$/g) |
|---|---|---|---|---|---|---|
| | P$_2$O$_5$ component material | MgO component material | P$_2$O$_5$ | MgO | Others SiO$_2$, etc. | |
| 1 | Orthophosphoric acid | Magnesium oxide | 77.7 | 22.3 | — | 5.4 |
| 2 | Metaphosphoric acid | Magnesium carbonate | 77.7 | 22.3 | — | 6.2 |
| 3 | Metaphosphoric acid | Magnesium oxide | 41.0 | 59.0 | — | 7.5 |
| 4 | Hexametaphosphoric acid | Magnesium oxide | 87.4 | 12.6 | — | 6.0 |
| 5 | Hexametaphosphoric acid | Serpentine | 36.8 | 31.7 | 31.7 | 6.4 |

The pigments obtained in Examples 2~5 are shown as specimens 2 to 5 in the test example referred to later. It is added that among the materials the sepentine used was the one produced in Iwate Prefecture, Japan.

EXAMPLE 6

There were mixed 100 parts of rock phosphate (produced in Florida), 54 parts of serpentine (produced in Iwate Prefecture) and 15 parts of peridotite (produced in Hokkaido), the mixture was roughly crushed and charged into an electric furnace thereby to be heated and melted, the molten substance was sprayed into a lot of water current whereby it was rapidly quenched, then it was guided into a sedimentation tank, and thereafter the sedimented substance was separated from water and dried, as the result of which there was obtained 156 parts of fine (mean particle surface area being about 0.1 m$^2$/g) vitrified substance. The composition of this vitrified substance was 20.2~20.6% of P$_2$O$_5$, 15.2~15.6% of MgO, 30.8~31.6% of CaO and 22.6~23.6 of SiO$_2$ in terms of oxides thereof. In the test example referred to later this vitrified substance is mentioned as specimen 6-A.

Further, the obtained vitrified substance was divided and classified to finally become a fine powder whose specific surface area is 15.5 m$^2$/g. This fine powder is mentioned as specimen 6-B.

EXAMPLES 7~8

100 parts of rock phosphate (produced in Florida), 75 parts of serpentine (produced in Iwate Prefecture) and siliceous sand or alumina were mixed in the proportion shown in Table 2, the mixture was heated, melted, quickly quenched and pulverized, and as the result there was obtained a pigment having a composition and a particle diameter shown in Table 2. The treatments were effected following Example 6.

TABLE 2

| Example No. | Siliceous sand | Alumina | Composition of product (%) | | | | | Specific surface area (BET) m²/g |
|---|---|---|---|---|---|---|---|---|
| | | | $P_2O_5$ | MgO | $SiO_2$ | $Al_2O_3$ | CaO | |
| 7 | 20 | 39 | 18.9 | 14.0 | 25.4 | 19.5 | 22.2 | 7.3 |
| 8 | 50 | — | 18.0 | 16.1 | 44.8 | — | 21.2 | 7.5 |

The pigments obtained in these Examples are shown as specimens 7~8 in the test example referred to later.

EXAMPLE 9

The materials in Example 6 was added with 0.5 parts of manganese ore (produced in Gabon) and treatments were carried out following Example 6, as the result of which there was obtained a pigment including 1.2% $MnO_2$ component. The powder before pulverizing in this Example is described as specimen 9-A while that after pulverizing is mentioned as specimen 9-B.

EXAMPLE 10

The materials in Example 6 were added with 0.5 parts of manganese ore (produced in Gabon) and 0.2 parts of boron sand (produced in Turkey) and treatments were effected following Example 6, as the result of which there was obtained a pigment including 1.1% $MnO_2$ component and 0.6% $B_2O_3$ component. The powder before pulverizing in this Example is described as specimen 10-A while that after pulverizing is mentioned as specimen 10-B.

TEST EXAMPLE

Preparation of paint

A paint having the following composition mixture is prepared by a paint shaker.

| Additive amount (%) of rust inhibiting pigment | 0% (Blanc) | 5% | 10% |
|---|---|---|---|
| Alkyd resin (solid part) | 30 | 30 | 30 |
| Body, extender pigment (calcium carbonate) | 54 | 49.8 | 45.6 |
| Rust inhibiting pigment | 0 | 4.2 | 8.4 |
| Drier | 0.84 | 0.84 | 0.84 |

As the Alkyd resin there was used "BEKKOZOL J577" manufactured by Nippon Reichhold Co., Ltd. and as the drier there was employed a mixture of lead octylate and cobalt octylate in the weight ratio of 2.4/1.

Preparation of a test piece for measuring the property of matter of painted film By using a No. 280 polished iron plate of JIS G-3141 (SPCC-SB) 0.8×75×150 mm) the test piece was spray painted, and it was dried at room temperature for a week.

Test method for water resistancy

The test piece was immersed up to at least 90 cm deep into pure water under the condition of room temperature (20±5° C.), and it was taken out 3 weeks (21 days) later thereby to evaluate it.

Test for salt water resistancy

Test was carried out by using a salt water spray testing machine (gas testing machine), based on JIS 5400(7.8), under the conditions of 5% salt water and 250 hour spraying time.

TABLE 2

| Name of specimen | Additive amount of specimen (g) | Evaluation | |
|---|---|---|---|
| | | Water resistancy | Salt water resistancy |
| Blank | — | 1 | 1 |
| 1 | 10 | 4 | 4 |
| 2 | 10 | 4 | 4 |
| 3 | 10 | 4 | 4 |
| 4 | 10 | 4 | 4 |
| 5 | 10 | 4 | 4 |
| 6-A | 10 | 4 | 4 |
| 6-B | 5 | 4 | 4 |
| " | 10 | 4 | 5 |
| 7 | 10 | 4 | 4 |
| 8 | 10 | 4 | 4 |
| 9-A | 5 | 4 | 4 |
| 9-B | 10 | 4 | 5 |
| 10-A | 5 | 4 | 4 |
| " | 10 | 4 | 5 |
| 10-B | 5 | 4 | 5 |
| " | 10 | 4 | 5 |
| Comparative specimen 1 | 10 | 4 | 4 |
| Comparative specimen 2 | 10 | 2 | 2 |
| Comparative specimen 3 | 10 | 3 | 3 |
| Comparative specimen 4 | 10 | 4 | 2 |

Itemization of the comparative specimens:
1: Zinc Chromate ZPC
2: Iron Oxide Red
3: Zinc Phosphate
4: COLOGINON SP-028 (manufactured by Mizusawa Kagaku Kogyo K.K.)
Evaluation standard (comparative example 4 is set standard and evaluation 4)
5 Excellent because of less corrosive degree than standard
4 Same corrosive degree as standard
3 Slightly greater corrosive degree than standard, being inferior a little
2 Greater corrosive degree than standard, being considerably inferior
1 Greater corrosive degree than standard, and rust is entirely noticed.

What is claimed is:

1. A method of inhibiting the corrosion of a metallic body which comprises coating the metallic body with a composition comprising a vitrified pigment which consists essentially of 15-80% by weight of $P_2O_5$ and 20-80% by weight of MgO in terms of oxides of phosphorous and magnesium respectively in a suitable vehicle, said pigment having the specific surface area of at least 0.1 m²/g and produced by mixing a phosphorus containing material with a magnesium-containing material, heating the mixture to molten form, and quickly quenching the molten mixture by projection or spraying the mixture into a jetting current of water.

2. A method of inhibiting the corrosion of a metallic body which comprising coating the metallic body with a composition comprising a vitrified pigment in a suitable vehicle, said pigment consisting essentially of 10-70% by weight of $P_2O_5$ and 5-75% by weight of MgO in terms of oxides of phosphorous and magnesium respectively, and more than one component selected from the group consisting of aluminum, silica, calcium, managanese and boron in the proportions of 5–30% by weight of $Al_2O_5$, 10–50% by weight of $SiO_2$, 15–40 by weight of CaO, 0.2–5% by weight of $MnO_2$ and 0.1–4% by weight of $B_2O_3$ in terms of oxides thereof, having the specific surface area in the range of 0.1–40 $m^2/g$ and produced by mixing a phosphorous-containing material, a magnesium-containing material, an aluminum-containing material, a silica-containing material, a calcium-containing material, a manganese-containing material or a boron-containing material, heating the mixture to molten form and quickly quenching the molten mixture by projecting or spraying the mixture into a jetting current of water.

* * * * *